United States Patent [19]

Sundberg

[11] 4,417,734
[45] Nov. 29, 1983

[54] SHAFT SEAL ASSEMBLY HAVING UNIVERSAL WASHER WITH BORES FOR SPRINGS

[75] Inventor: Jack G. Sundberg, Meriden, Conn.

[73] Assignee: Chandler Evans Inc., West Hartford, Conn.

[21] Appl. No.: 489,019

[22] Filed: Apr. 27, 1983

[51] Int. Cl.³ .............................................. F16J 15/34
[52] U.S. Cl. .................................. 277/93 SD; 277/9; 277/166
[58] Field of Search .............. 277/81 R, 93 R, 93 SD, 277/166, 9, 38, 40, 41

[56] References Cited

U.S. PATENT DOCUMENTS

| | | | |
|---|---|---|---|
| 1,054,149 | 2/1913 | Tebbets | 277/93 R |
| 2,575,549 | 11/1951 | Doble | 277/93 R |
| 2,585,154 | 2/1952 | Montgomery | 277/93 R X |
| 2,736,624 | 2/1956 | Shoenrock | 277/41 X |

FOREIGN PATENT DOCUMENTS 45-5983 2/1970 Japan ................................ 277/93 R Primary Examiner—Robert S. Ward
Attorney, Agent, or Firm—Radford W. Luther; Richard A. Dornon

[57] ABSTRACT

A shaft seal assembly for an aircraft engine fuel pump has a seal housing (30) mounted upon the pump housing (32). A carbon face seal (42) is in wiping engagement with a seal face (40) on the drive shaft (36) of the pump. The carbon face seal has a recess (46) which receives a projection (44) for preventing face seal rotation. A universal washer (46), which is mounted in the seal housing in front of the carbon face seal, embodies four protuberances (48, 50, 52, 54) having bores (56, 58, 60, 62) which extend completely through the universal washer. Compression springs (64, 66) are contained in the bores and have their rear and front extremities in respective engagement with washers (70, 72) disposed on either side of the universal washer. The spring force, which is transmitted to the carbon face seal by the front washer, is overcome as pump pressure pushes the shaft toward the front of the pump. In the compressed condition, non-axial shaft alignments are accommodated by the universal washer.

4 Claims, 7 Drawing Figures

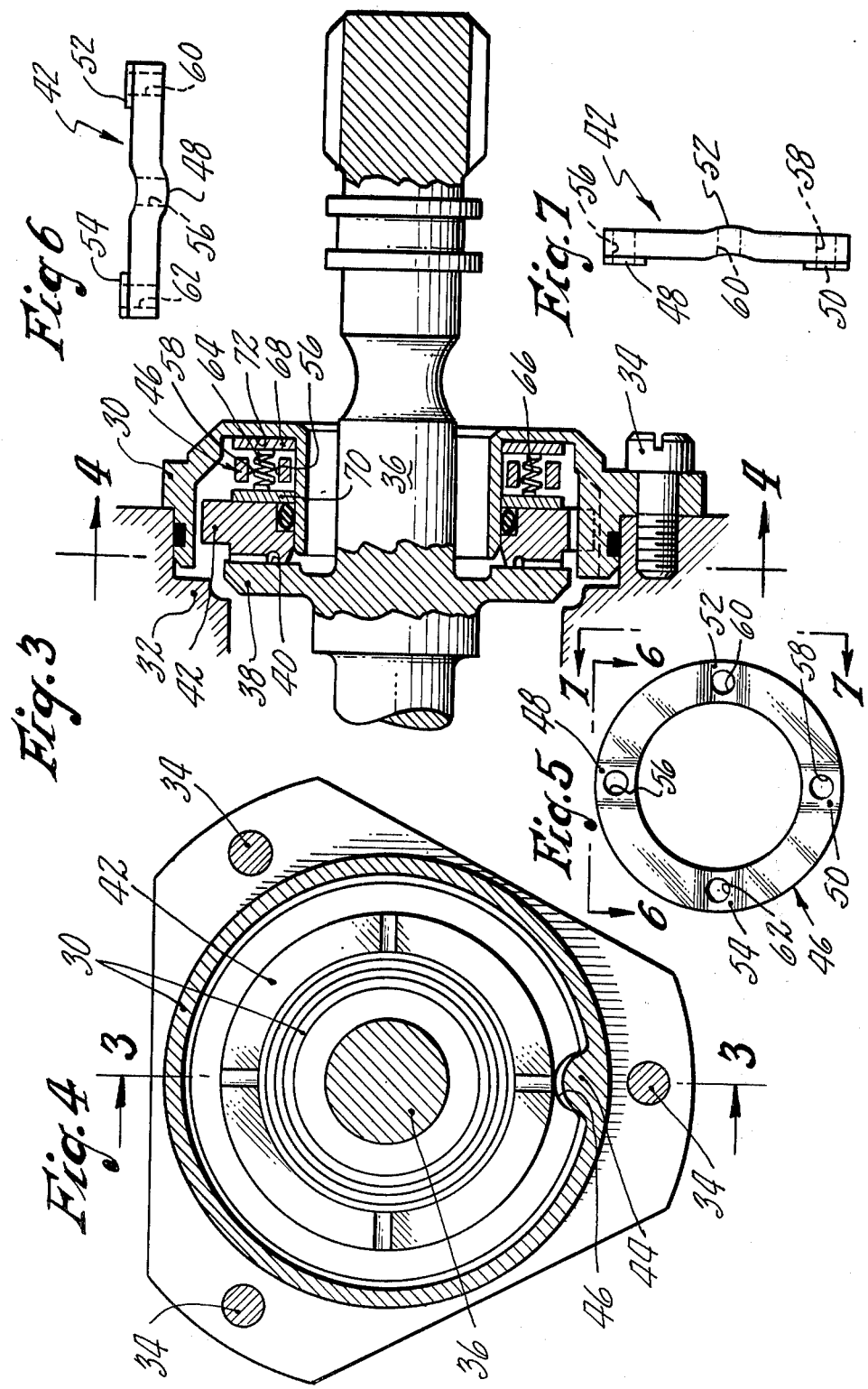

SHAFT SEAL ASSEMBLY HAVING UNIVERSAL WASHER WITH BORES FOR SPRINGS

TECHNICAL FIELD

This invention relates to shaft seals, and more particularly, to shaft seals for aircraft engine fuel pumps.

BACKGROUND ART

While existing shaft seals assemblies for aircraft engine fuel pumps exhibit satisfactory performance, they have a relatively large number of parts which mandate a long length and a consequential tolerance stack-up which requires shimming to adjust the spring load to its operation range. In addition, certain shaft seal assemblies embody antirotation washers with bent tabs which may scar the carbon face seal.

DISCLOSURE OF INVENTION

A seal assembly of the invention may essentially comprise a carbon face seal and a relatively thick universal or gimbal washer, having springs extending therethrough at the bulges or protuberances thereof, sandwiched between two conventional washers. In a seal assembly of the invention the carbon face seal may incorporate one or more longitudinally extending recesses in its outer periphery for receiving a projection on the seal housing, thereby to prevent any rotation of the carbon face seal.

A seal assembly of the invention is advantageous in that it is shorter than conventional seals and incorporates fewer parts, thereby obviating shimming to place the spring load in its operating range. In accordance with the invention, a seal assembly thereof does not mandate the inclusion of a thrust washer, an antirotation washer or cavities in the seal housing for mounting the springs. In contradistinction to a conventional seal assembly wherein the thrust washer is employed to minimize cycling of the springs during operating, it will be appreciated that in a seal assembly according to the invention the cycling of springs is also minimal because of their being disposed at the pivot points of the universal washer whereby the springs are essentially inoperative.

Accordingly, it is a primary object of the invention to provide a relatively short shaft seal assembly having a minimal number of parts.

This and other objects and advantages of the invention will become more readily apparent from the following detailed description when taken in conjunction with the accompanying drawings, in which:

BRIEF DESCRIPTION OF DRAWINGS

FIG. 3 is a sectional side elevational view of a shaft seal assembly according to the invention.

FIG. 4 is a rear elevational view of the shaft seal assembly of FIG. 2, taken substantially along the line 4—4 of FIG. 3.

FIG. 5 is a rear elevational view of the universal washer, per se, of FIG. 3.

FIGS. 6 and 7 are respectively top and side views of the washer of FIG. 5 taken along the respective lines, 6—6 and 7—7.

BEST MODE OF CARRYING OUT THE INVENTION

Figure 1:
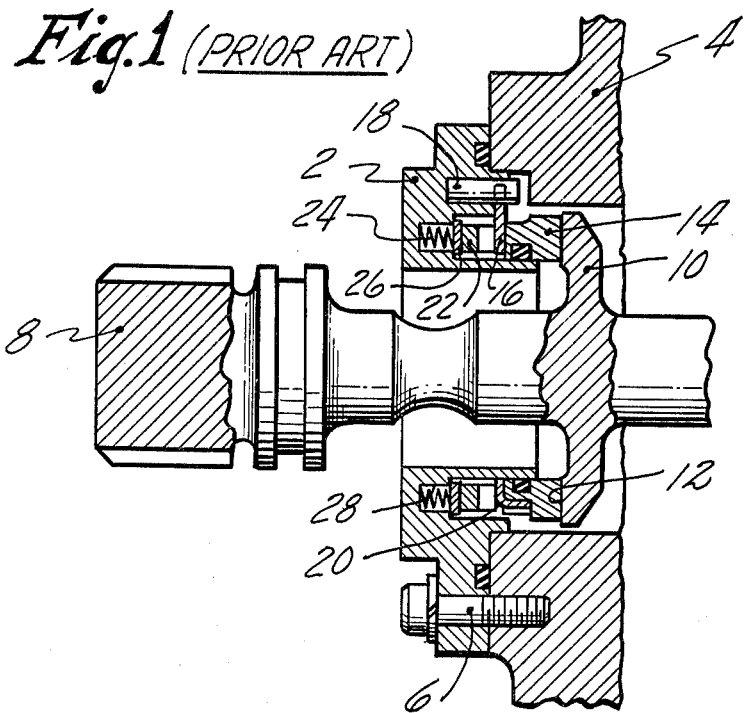
FIG. 1 is sectional side elevational view of a conventional shaft seal assembly of an aircraft fuel pump.
Figure 2:
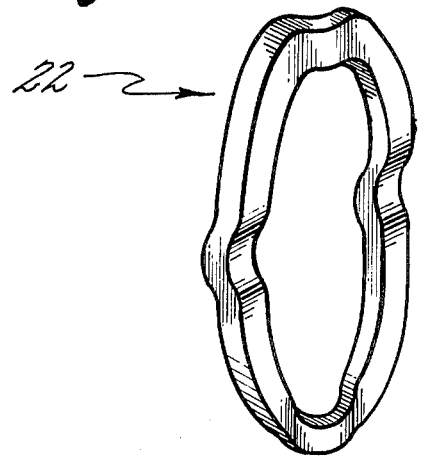
FIG. 2 is a perspective view of the universal washer.

With reference to FIGS. 1 and 2, it would be profitable to briefly examine the construction of a typical conventional shaft seal assembly for an aircraft engine fuel pump before describing a seal of the invention. The seal assembly of FIGS. 1 and 2 includes a seal housing 2 secured to a pump housing 4 by means of bolts 6. A pump drive shaft 8, having a flange 10 with a seal face 12 formed thereupon, extends into the housing away from its splined end where it is in driving connection with a rotating pump component such as a gear or the like. When the pump is operating normally, pressure forces urge the shaft 8 to the left or toward its splined end. The necessary sealing action is furnished by the engagement of a carbon face seal 14 and the seal face 12 during engine starting and normal engine operation.

To the rear or left of the carbon face seal 14 is an antirotation washer 16 which is cutaway on its periphery to receive a rotation preventing pin 18 mounted in the seal housing 2. The washer 16 also incorporates a bent tab 20 which is contained in a peripheral recess at the rear of the carbon face seal 14. Washer 16 basically serves to transfer torque from the carbon face seal 14 to the pin 18 whereby the face seal will not undergo any rotational movement. Behind the washer 16, a universal or gimbal washer 22 (sometimes termed a dimpled washer) is mounted in the seal housing 2 for accommodating non-axial shaft alignments. Interposed between the universal washer 22 and a plurality of springs 24 is a thrust washer 26 which urges the universal washer forwardly. It will be noted that each of the springs 24 is mounted in a cavity 28 in the seal housing 2. After pressure forces build to an extent sufficient to urge the thrust washer 26 to the rear against the seal housing 2, the springs 24 will only extend when the shaft is no longer axially aligned with the seal axis.

A shaft seal assembly of the invention is shown in FIGS. 3 and 4. With reference thereto, a seal housing 30 is secured to a pump housing 32 by bolts 34. A pump drive shaft 36, having a flange 38 with a seal face 40 formed thereupon, extends into the pump housing 32 into driving connection with a rotating pump component. During normal operation, pressure forces urge the shaft 36 to the right. A carbon face seal 42, mounted for axial movement within the seal housing 30, engages the seal face 40 during engine starting and normal engine operation whereby sealing engagement is thereby provided in a manner similar to that of the shaft seal of FIG. 1.

From FIGS. 3 and 4, it may be seen that rotation of the carbon face seal 42 is prevented by a rounded projection 44 on the inner periphery of the seal housing 30 which is received within a similarly shaped rounded recess 46 in the carbon face seal 42. It will be appreciated that such an antirotation feature will not trammel the axial movement of the carbon face seal. An alternative approach (not illustrated) to the aforedescribed antirotation arrangement would be the provision of a steel ball half contained in a hemispherical recess in the outer surface of the carbon face seal and half contained in an axially extending recess on the inner periphery of the seal housing 30. Another alternative design would be that shown in FIG. 1 wherein a conventional antirotation washer is employed. With regard to the latter mentioned antirotation arrangement, it will become apparent from the ensuing description that such an arrangement will not occasion an increase in seal length since a washer or spring set of some sort must in any event be placed against the front or non-wiping face of the carbon face seal 42.

The heart of the illustrated seal assembly is a universal or gimbal washer 46 mounted in the seal housing 30. The universal washer 46 is generally identical in shape to that shown in FIG. 2 save for increased thickness. The washer 46 has four protuberances or dimples 48, 50, 52 and 54 thereupon, whereby the washer 46 is pivotable about any axis orthoginal to the axis of the shaft 36 in the manner of a conventional universal washer. It will be noted that the protuberances 48 and 50 are diametrically opposed on the rear face of the washer 46 and that the protuberances 52 and 54 are diametrically opposed on the front face of the washer 46 and are spaced ninety degrees from the protuberances on the rear face thereof. Bores 56, 58, 60 and 62 are centrally disposed in the respective protuberances 48, 50, 52 and 54 and extend from the front to the rear face of the washer 46.

Compression springs 64 and 66 are contained within the respective bores 56 and 58 and have their extremities extending well beyond the front and rear faces of the washer 46. Bores 60 and 62 contain similar springs (not shown). Preferably, four springs should be utilized although it will be understood that two could suffice for certain applications. On either side of the universal washer 46, washers 68 and 70 are mounted in the seal housing 30. Washer 68, which serves as a spring seat, abuts the front inner wall 72 of the seal housing whereas washer 70 abuts the front face of the carbon face seal 42. The front extremities of the springs seat against the washer 70 whereby the carbon face seal 42 is biased into engagement with the seal face 42.

During engine starting, the carbon face seal 42 will be held in engagement with the seal face 40 by the urging of the springs in the seal assembly. As engine speed increases, fuel pressure acting on the rear or left side of the flange 38 will correspondingly increase until it overcomes the spring force, whereby the shaft 36 will move to the right when viewed in FIG. 3. Movement of the shaft 36 to the right results in rightward axial movement of the carbon face seal 42 and washer 70 in the seal housing 30. During such axial movement, washer 70 will engage the protuberances 48 and 50 whereupon the universal washer 46 will be axially displaced rightwardly or toward the front of the pump until protuberances 52 and 54 contact the washer 58 whereby the seal assembly will be fully compressed. After compression of the seal assembly, alignment variations in the shaft will be accommodated by the universal washer 46. Because the springs are located at the points of rotation of the universal washer, minimum cycling of the springs will be engendered. It will be appreciated that although the universal washer embodies bores in the protuberances which beget higher stresses therein, the additional thickness of the universal washer renders such stresses acceptable.

Obviously, many variations and modifications are possible in light of the above teachings without departing from the scope or spirit of the invention as defined in the appended claims:

I claim:

1. In an improved shaft seal assembly for a pump having a pump housing and a drive shaft with a seal face extending therein of the type comprising: a seal housing mounted upon the front of the pump housing in surrounding relationship to the drive shaft, a carbon face seal, having its rear face in wiping engagement with the seal face, mounted in the seal housing for axial movement therein; a universal washer having two protuberances on each side thereof in diametrically opposed relationship mounted in the seal housing between the rear face of the carbon face seal and the front inner wall of the seal housing; and wherein the improvement comprises:

first and second bores extending respectively through the protuberances on one side of the universal washer;

first and second compression springs respectively mounted in the first and second bores; and means for engaging the extremities of the first and second springs for transmitting the urging thereof to the carbon face seal.

2. The improvement of claim 1, further comprising:

third and fourth bores extending respectively through the protuberances on the other side of the universal washer;

third and fourth compression springs respectively mounted in the second mentioned bores; and means for engaging the extremities of the third and fourth springs for transmitting the urging thereof to the carbon face seal.

3. The improvement of claim 2, wherein the first mentioned and second mentioned extremity engaging means comprises: a washer mounted in the seal housing in abutting relationship with the front face of the carbon face seal.

4. The improvement of claim 2, further comprising:

a recess on the periphery of the carbon face seal; and a projection on the seal housing received with the recess for preventing rotation of the carbon face seal.

* * * * *